(12) United States Patent
Weigand (10) Patent No.: US 7,734,795 B2
(45) Date of Patent: *Jun. 8, 2010

(54) TRANSLATING SWITCH AND METHOD (75) Inventor: Gilbert G. Weigand, Ashburn, VA (US)

(73) Assignee: AOL Inc., Dulles, VA (US)

( * ) Notice: Subject to any disclaimer, the term of this patent is extended or adjusted under 35 U.S.C. 154(b) by 905 days.

This patent is subject to a terminal disclaimer.

(21) Appl. No.: 11/423,578

(22) Filed: Jun. 12, 2006

(65) Prior Publication Data

US 2007/0038774 A1    Feb. 15, 2007

Related U.S. Application Data

(63) Continuation of application No. 10/259,800, filed on Sep. 30, 2002, now Pat. No. 7,080,148.

(51) Int. Cl.
G06F 15/16 (2006.01)
G06F 15/173 (2006.01)

(52) U.S. Cl. .............. 709/228; 709/224; 709/238; 709/246

(58) Field of Classification Search ........... 709/223, 709/224, 226, 246
See application file for complete search history.

(56) References Cited

U.S. PATENT DOCUMENTS

| 6,061,349 | A | 5/2000 | Coile et al. |
|---|---|---|---|
| 6,246,683 | B1 | 6/2001 | Connery et al. |
| 6,331,984 | B1 | 12/2001 | Luciani |
| 6,389,448 | B1 | 5/2002 | Primak et al. |
| 6,418,169 | B1 | 7/2002 | Datari |
| 6,430,622 | B1 | 8/2002 | Aiken, Jr. et al. |
| 6,484,196 | B1 | 11/2002 | Maurille |
| 6,581,108 | B1 * | 6/2003 | Denison et al. ............ 709/245 |
| 6,651,101 | B1 | 11/2003 | Gai et al. |
| 6,662,223 | B1 | 12/2003 | Zhang et al. |
| 6,807,648 | B1 | 10/2004 | Cansever et al. |
| 6,823,131 | B2 | 11/2004 | Abelard et al. |
| 6,850,519 | B1 | 2/2005 | Saito et al. |
| 7,080,148 | B2 * | 7/2006 | Weigand ..................... 709/228 |
| 7,085,267 | B2 * | 8/2006 | Carey et al. ................ 370/389 |
| 7,406,043 | B1 * | 7/2008 | Chu et al. ................... 370/230 |

OTHER PUBLICATIONS

International Search Report, PCT/US03/30560, dated Feb. 27, 2004.

* cited by examiner

*Primary Examiner*—Hussein A Elchanti
(74) *Attorney, Agent, or Firm*—Fish & Richardson P.C.

(57) ABSTRACT

Payload information in a data unit may be translated into the attribute portion of a data unit by receiving a first data unit from a terminal with payload information, identifying attribute information from within the payload information, and translating the first data unit into a translated data unit having an attribute portion corresponding to the attribute information from within the payload information of the first data unit.

20 Claims, 9 Drawing Sheets

TRANSLATING SWITCH AND METHOD

CROSS-REFERENCE TO RELATED APPLICATIONS

This application is a continuation of U.S. patent application Ser. No. 10/259,800, filed Sep. 30, 2002, titled "Translating Switch and Method", now allowed. The entire contents of the prior application are incorporated herein by reference.

This application also incorporates by reference U.S. Provisional Application No. 60/286,964, titled "Generating Multiple Data Streams from a Single Content Source" and filed Apr. 30, 2001; U.S. Provisional Application No. 60/373,329, titled "Stream Management" and filed Apr. 18, 2002; U.S. Provisional Application No. 60/343,182, titled "Duplicating Digital Streams for Digital Conferencing Using Switching" and filed Dec. 31, 2001; U.S. application Ser. No. 09/893,692, titled "Generating Multiple Data Streams from a Single Content Source" and filed Jun. 29, 2001; U.S. application Ser. No. 10/090,727, titled "A Duplicating Switch for Streaming Data Units to a Terminal" and filed Mar. 6, 2002; U.S. application Ser. No. 10/134,439, titled "Duplicating Digital Streams for Digital Conferencing Using Switching Technologies" filed Apr. 30, 2002; and, U.S. application Ser. No. 10/134,552, titled "Managing Access To Streams Hosted on Duplicating Switches" and filed Apr. 30, 2002.

TECHNICAL FIELD

This description relates generally to networking and more particularly to a translating switch used in networking.

BACKGROUND

Data center systems typically may be analyzed and classified into different types of equipment. Some equipment may be classified as the networking infrastructure that is responsible for the connectivity between different devices. Other equipment (e.g., servers) may be classified as part of a host that enables a terminal to access content on the host.

Typically, as part of the network infrastructure, the networking equipment has been used to perform network operations to forward traffic on a network. As a result of advances in networking technology generally, the processing power of networking equipment has been increased, resulting in increased performance metrics for these devices.

SUMMARY

In one aspect, payload information in a data unit may be translated into an attribute portion of a data unit by receiving from a terminal a first data unit with payload information, identifying attribute information from the payload information, and translating the first data unit into a translated data unit. The translated data unit relates the attribute information referenced in the payload information of the first data unit into the attribute portion of the translated data unit.

Implementations may include one or more of the following features. For example, the translated data unit may be transmitted to a host. A response may be received to the translated data unit. The response may be reverse translated so that the terminal recognizes the response to the first data unit. Reverse translating the response to the translated data unit may include mapping the attribute portions in the response to the translated data unit into the payload information of the reverse-translated response. The payload information may include a personalized resource. The personalized resource may include access to an electronic mail message, an instant messaging service, a web page, and a media stream.

The first data unit may include a request for content. The payload information may include data selection information within an array of data selection information. The payload information may include premium content for which access is verified. The attribute portion may include layer-three addressing information. The layer-three addressing information may include an Internet Protocol address. The attribute portion may include one or more port addresses. Translating the payload information to the attribute portion may include translating the payload information using more than one tier.

The tiers may include a user tier in the attribute portion to indicate the user, an application tier in the attribute portion to indicate an application, and a selection tier in the attribute portion. The attribute portion may be selected based on a state of demand for resources, with the resources including one or more applications referenced by the payload information. The attribute portion may be selected to accommodate increased demand within an addressing space that includes the attribute portion. An interface for the host may be created so that the host may respond to the translated data unit. Interfacing with the host may be performed dynamically in response to receiving the first data unit.

A translating table may be loaded with one or more parameters describing a user state, the user state indicating a profile for a user. The profile may include parameters enabling the response to the translated data unit to be associated with the profile. Determining the attribute portion of the data unit may include identifying a user state. Translating the first data unit may include mapping one or more portions of the profile to the attribute portion of a data unit.

Implementations may include a system or program capable of achieving the above features, including, for instance, a translating switch, a terminal, a host, and a network between these components.

The details of particular implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

In general, a terminal interfaces with a translating switch to access a host. The terminal sends a data unit (e.g., a packet) to the translating switch. The translating switch identifies attribute information from within payload information in the data unit. The translating switch then translates the received data unit into a translated data unit with an attribute portion corresponding to the attribute information identified from within the payload information. The translating switch then sends the translated data unit to the host. The host sends the translating switch a response to the translated data unit, and the translating switch reverse translates the data unit (e.g., by mapping information from the attribute portion of the data unit to the payload portion of the data unit). The translating switch then transmits the reverse-translated response to the terminal.

Figure 1:
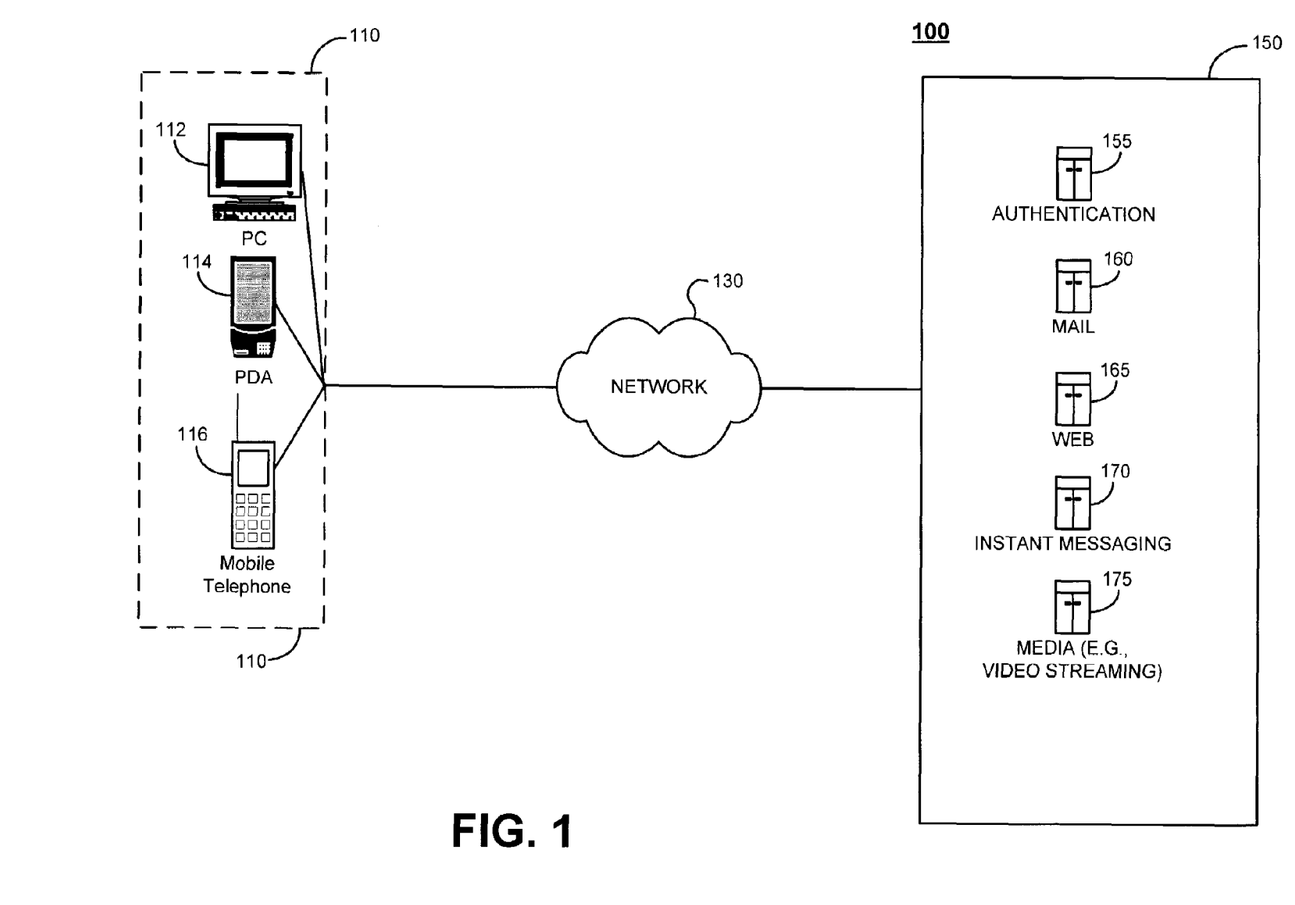
FIG. 1 is a diagram of an exemplary communications system structured and arranged to enable a terminal to access a host through a network.

Referring to communications system 100 in FIG. 1, a terminal 110 may exchange data with a host 150 through a network 130. Specifically, the network 130 may receive communications from the terminal 110 and translate the communications by mapping payload information into an attribute portion of a data unit. By mapping payload information into the attribute portion of the data unit, the network 130 may perform connection management and data selection normally performed on the host. This may increase the processing efficiency and/or enable processing resources to be managed dynamically.

The terminal 110 may include one or more devices capable of accessing content on the host 150. The terminal 110 may include a controller (not shown) that processes instructions received from or generated by a software application, a program, a piece of code, a device, a computer, a computer system, or a combination thereof, which independently or collectively direct operations of the terminal 110. The instructions may be embodied permanently or temporarily in any type of machine, component, equipment, storage medium, or propagated signal that is capable of being delivered to the terminal 110 or that may reside with the controller at terminal 110. Terminal 110 may include a general-purpose computer (e.g., a personal computer (PC) 112) capable of responding to and executing instructions in a defined manner, a workstation, a notebook computer, a PDA ("Personal Digital Assistant") 114, a wireless phone 116, a component, other equipment, or some combination of these items that is capable of responding to and executing instructions.

In one implementation, the terminal 110 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, terminal 110 may include a wireless telephone running a micro-browser application on a reduced operating system with general purpose and specialized hardware capable of operating in mobile environments.

The network 130 may include hardware and/or software capable of enabling direct or indirect communications between the terminal 110 and the host 150. As such, the network 130 may include a direct link between the terminal 110 and the host 150, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or other delivery mechanism for carrying data.

The network 130 may use an internal addressing space that differs from the addressing space used by the terminal. For example, the terminal 110 may send a request to a host 150 on one set of addresses. However, the network 130 may interface with these requests and translate the communications from the terminal to an internal addressing space. The internal addressing space may be much larger than the addressing spaces with which the external systems are configured to interface. For example, the addressing space used internally may include addressing resources not assigned to the network. The network 130 may enable a larger addressing space to be used by translating communications across the network between the internal and external addressing spaces. The network 130 and the host 150 may share a common internal addressing space.

One example of a host 150 is a general-purpose computer (e.g., a server) capable of responding to and executing instructions in a defined manner. Other examples include a personal computer, a special-purpose computer, a workstation, a device, a component, other equipment, or some combination thereof capable of responding to and executing instructions. The host 150 may include and/or form part of an information delivery network, such as, for example, the Internet, the World Wide Web, an online service provider, and/or any other analog or digital wired and/or wireless network that provides information. Such information delivery networks may support a variety of online services, including Internet and/or web access, e-mail, instant messaging, paging, chat, interest groups, audio and/or video streaming, and/or directory services.

The host 150 may receive instructions from a software application, a program, a piece of code, a device, a computer, a computer system, or a combination thereof that independently or collectively directs operations of the node. The instructions may be embodied permanently or temporarily in any type of machine, component, equipment, storage medium, or propagated signal that is capable of being delivered to the host 150.

In one implementation, the host 150 includes one or more information-providing software applications for accessing and transmitting requested files to the terminal 110. The information-providing applications may run on a general-purpose operating system and a hardware platform that includes a general-purpose processor and/or specialized hardware. Another implementation may include a reduced operating system with both general purpose and specialized hardware to operate in mobile environments. One example of a host 150 as a specialized device may include one or more duplicating switches. For example, the media host 175 may include a duplicating switch that enables thousands of users to access a video stream.

A host device may run several applications, or a host device may be dedicated to one or more applications. Examples of the host device dedicated to one application may include an authentication host 155, a mail host 160, a web host 165, an instant messaging host 170, and a media host 175.

Generally, the authentication host 155 provides security and/or authentication services for the host 150. For example, a user may be prompted for a login name (or other identifier) and password when initially accessing a service provider network. Other examples of services provided by the authentication host 155 may include key management services, validation, and managing access control lists.

Typically, the mail host 160 enables a terminal to access an electronic mailbox to send and receive electronic mail messages. Other services provided as part of the mail host may include virus checking, 'spam' mail filtering, address book services, and message management.

Generally, the web host 165 enables a terminal to access one or more pages of web content. This web content may include a personalized web page, news pages, e-commerce sites, and other services appearing in a web front end (e.g., a calendaring or a mail service accessed through a web front-end).

Instant messaging host 170 typically enables a terminal to exchange instant messages (IM). Examples of the services provided through an instant messaging host may include buddy lists, directory services, and online status information. Other services may be accessible through an IM front end. For example, an instant message may be converted to an electronic mail message when the user is offline.

Media host 175 typically comprises one or more streaming media devices that enable a terminal to access streaming media. Examples of the streaming media may include video, audio, text messaging (e.g., chat), a proprietary application, and/or a combination of the above services. The streaming services may be integrated across one or more devices. For example, a videoconference application for thirty users may be hosted on three duplicating switches, with a server providing metadata services.

Although five host applications are described, other applications are possible. For example, other host services not described above may include online games and financial services. Furthermore, although the host applications are illustrated on separate and distinct devices, the devices may share one or more software applications, devices, resources, and components. For example, a mail server also may run an instant-messaging application. In another example, several hosts may access a common directory service.

Figure 2A:
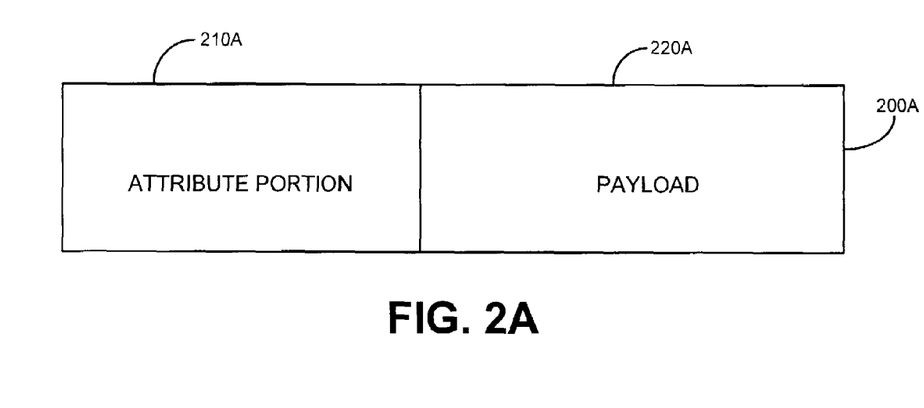
FIG. 2A is a diagram of an exemplary data unit that may be transmitted in the communications system of FIG. 1.

Referring to FIG. 2A, an exemplary data unit 200A includes an attribute portion 210A and payload information 220A. The attribute portion 210A typically includes parameters that are modified as the data unit 200A moves through the communications system 100. For example, an IP data unit may change the layer two addressing information as the data unit moves through the network (e.g., network 130). The payload information 220A typically includes information including content and/or parameters that are intended for communication from the source system and tend to remain unchanged or change infrequently during transmission to preserve integrity of the data being transmitted. For example, the payload information 220A may include audio or video content being transmitted to a personal computer (e.g., terminal 110).

Figure 2B:
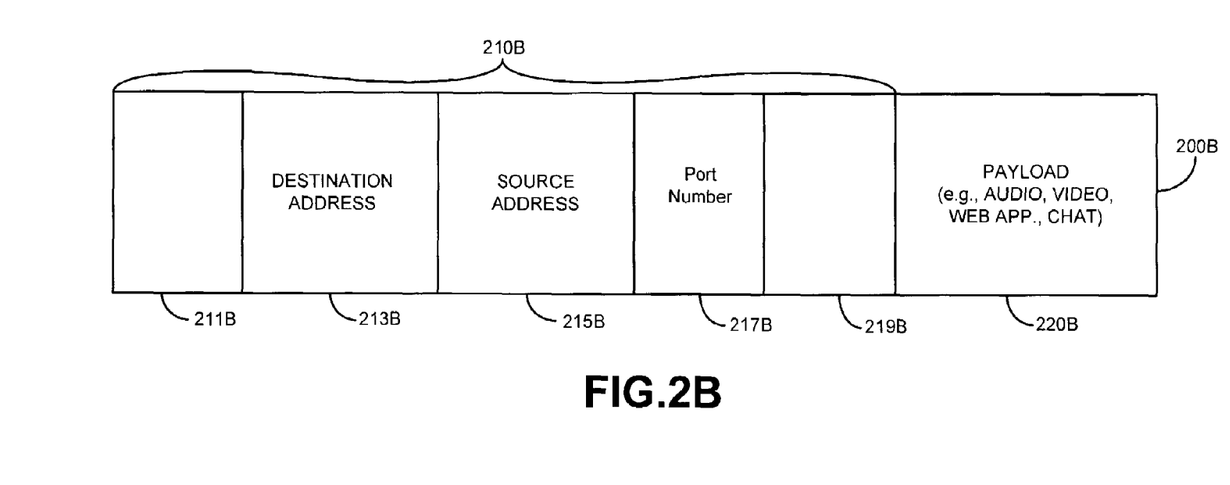
FIG. 2B is a diagram illustrating one example of the structure of an attribute portion of the data unit of FIG. 2A.

Referring to FIG. 2B, the attribute portion 210B of the data unit 200B may include several distinct or intermingled fields, such as, for example, fields of an IP ("Internet Protocol") packet. More particularly, for example, attribute portion 210B may include a destination address 213B, a source address 215B, a port number 217B indicating the type of IP traffic (e.g., UDP ("User Data Protocol"), TCP ("Transmission Control Protocol"), ICMP ("Internet Control Message Protocol")), and other parameters at various portions as represented by 211B and 219B. These fields may be arranged as shown, or otherwise, to accommodate various protocols. The payload information in the IP data unit 200B is represented by 220B. Although layer three parameters have been described, other layers of the protocol stack may include similar parameters.

Figure 3:
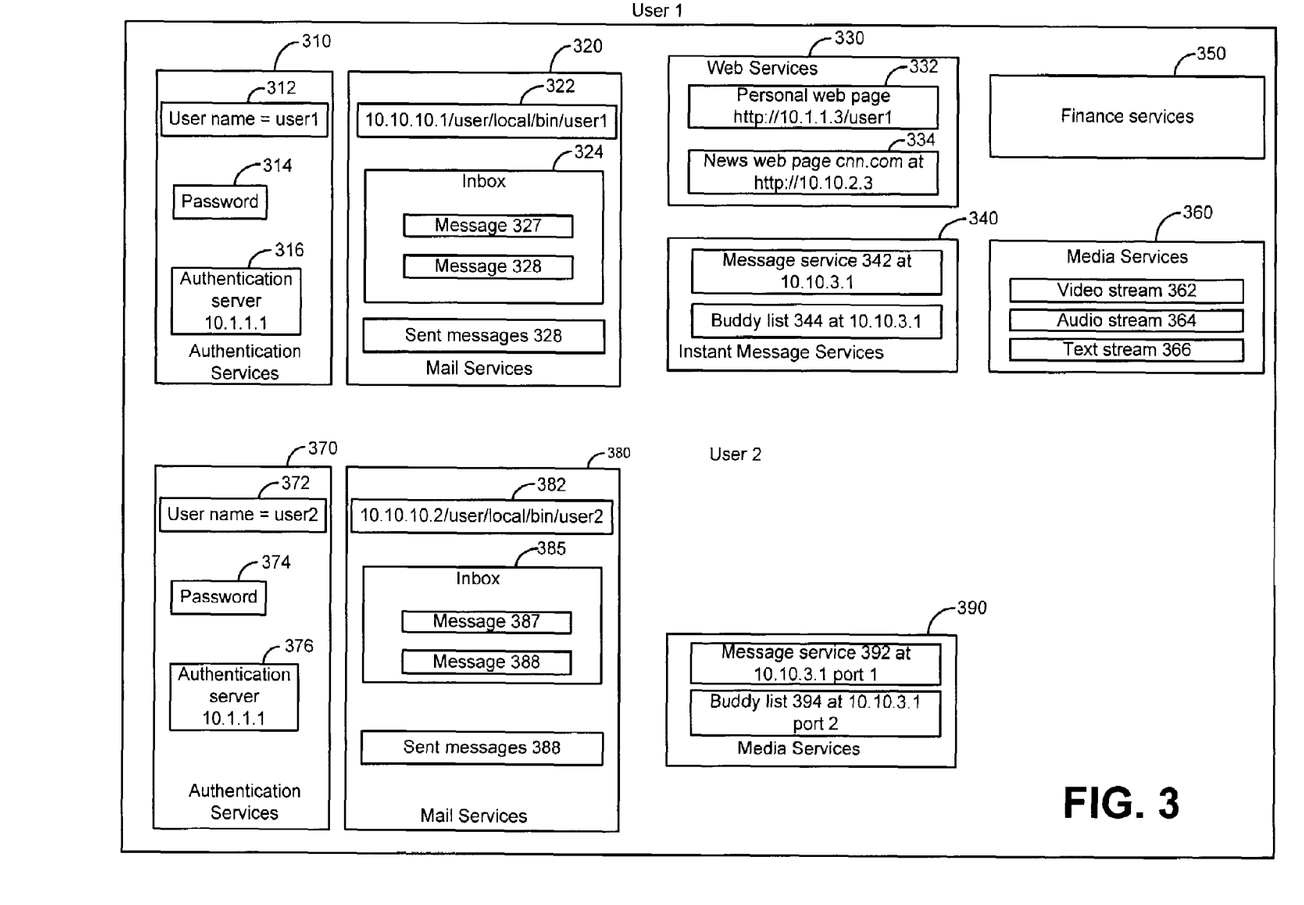
FIG. 3 is a table showing an exemplary relationship between two user applications and the host resources that may be referenced by the user applications.

FIG. 3 illustrates user services and associated host resources. For example, user 1 accesses authentication services 310, mail services 320, web services 330, instant messaging services 340, finance services 350, and media services 360. Similarly, user 2 may access authentication services 370, mail services 380, and instant messaging services 390.

Authentication service 310 typically is used by a service provider to validate a user's access to the resources of user 1. To access authentication services 310, user 1 typically enters a user name 312 (e.g., a screen name, a login name, an email address) and password 314 to an authentication server 316. In this case, authentication server 316 has an IP address of 10.1.1.1. Likewise authentication services 370 are available to user 2. For instance, user 2 uses user name 372 and password 374 on authentication server 376. Typically, the authentication server may handle many authentication requests. For example, user 1 and user 2 may both access the same IP address (e.g., 10.1.1.1) for authentication.

Mail services 320 typically enable a user to access one or more electronic mailboxes. These mailboxes enable a user to send electronic mail and to access sent or received electronic mail. Mail services 320 for user 1 are available on a resource 322 with an IP address of 10.10.10.1, for example, in directory/usr/local/bin/user1. Mail services 320 include folders for an inbox 324 (e.g., with messages 327 and 328) and a sent messages folder 328. Although only two messages are shown, mail services typically include many messages. In this case, messages 327 and 328 illustrate that a message may be a selectively accessible resource within a larger resource, in this case inbox 324. Similarly, user 2 accesses mail services 380 on resource 322 with an IP address of 10.10.10.2 in directory user/local/bin/user2. User 2 typically has an inbox 385 with messages 387 and 388.

Web services 330 describe one or more web resources that a user may access. In one example, a user may have an application written to a web front end. For example, a chess game may be accessed through a Java-enabled web page. In another example, a user may manage a personal web page. In yet another example, the web services may include one or more servers that the user accesses for news (e.g., cnn.com). In the case of user 1, a personalized web page 332 is available at IP address 10.1.1.3 and a news web page is available at IP address 10.10.2.3.

Instant Messaging (IM) services 340 typically enable a user to access one or more instant messaging resources. For example, user 1 may access a message service 342 (e.g., a server) at IP address 10.10.3.1 to send and exchange instant messages. A network-based buddy list 344 also may be accessible as part of the IM services 340. Similarly, user 2 may access IM services 390, e.g., on a device with an IP address of 10.10.3.2. For particular IM services, the message service 392 may be addressed on port 1 to exchange instant messages and the buddy list 394 may be located on port 2.

Other examples of host services may include finance services 350. The finance services may include stock quotes, banking and account management, and news feeds. This service may be a personalized resource (e.g., user 1 only as shown) or a public resource.

Other host services may include media services 360. These media services may include a video stream resource 362, an audio stream resource 364, and a text-based resource 366 (e.g., chat).

Figure 4:
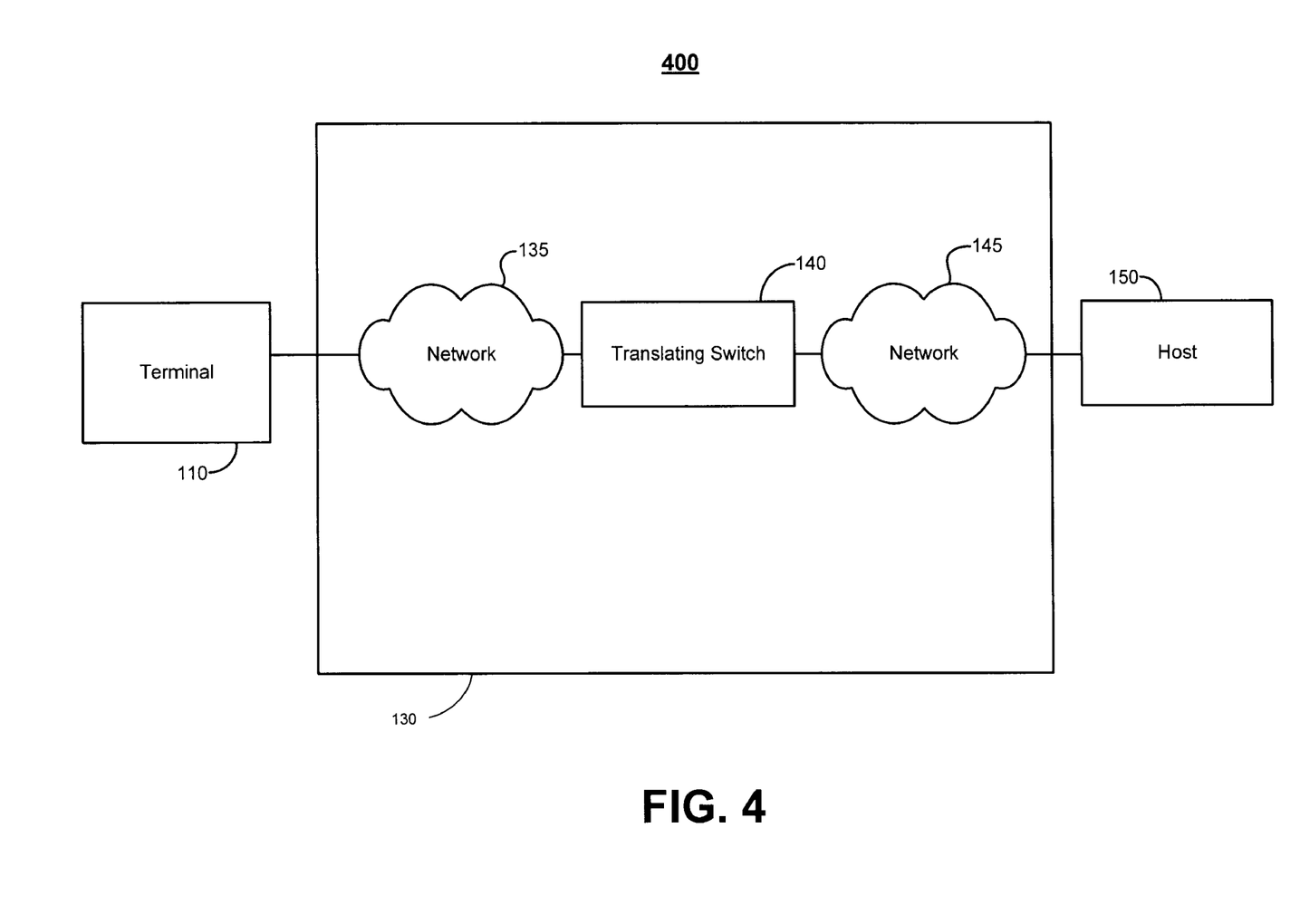
FIG. 4 is a diagram of an exemplary communications system that includes a translating switch structured and arranged to translate one or more data units from a terminal to a host.

Referring to FIG. 4, a communications system 400 may exchange data between a terminal 110 and a host 150 through a translating switch 140. The translating switch 140 maps payload information received in a data unit from the terminal 110 into the attribute portion of a translated data unit (e.g., into the IP address and port number of a packet). Aspects of communications system 400 may relate to aspects of communications system described previously. For example, the terminal 110 and the host 150 in FIG. 3 generally relate to the terminals and hosts described previously. Similarly, aspects of network 130, which includes network 135, translating switch 140, and network 145, may relate to aspects of the network 130 described previously. However, although communications system 400 illustrates how a translating switch 140 may be integrated by a network 130, other implementations are contemplated which do not integrate the translating switch 140 into network 130.

Generally, terminal 110 interfaces with network 130 to access host 150. Specifically, the terminal 110 interfaces with a translating switch 140 through the network 135 to exchange data units with the host 150. The translating switch 140 then interfaces with the host 150 through the network 145. Generally, the translating switch 140 is structured and arranged to receive a first data unit, analyze one or more pieces of payload information, and map the payload information into the attribute portion of the translated data unit.

Although network 130 shows networks 135 and 145 as separating the translating switch 140 from the terminal 110 and the host 150, the terminal 110 and the host 150 may interface directly with the translating switch 140 without going through an intermediary network. Also, although one translating switch 140 is shown, more than one translating switch 140 may be used, including more than one translating switch per terminal and/or user. For example, one translating switch 140 may be used to support mail services for several users while another translating switch 140 may be used to support IM and streaming media services. In another example, a first translating switch 140 may translate data units while a second translating switch may reverse translate data units. Yet another example may include redundant (e.g., fail over) and/or load balanced translating switches.

Figure 5:
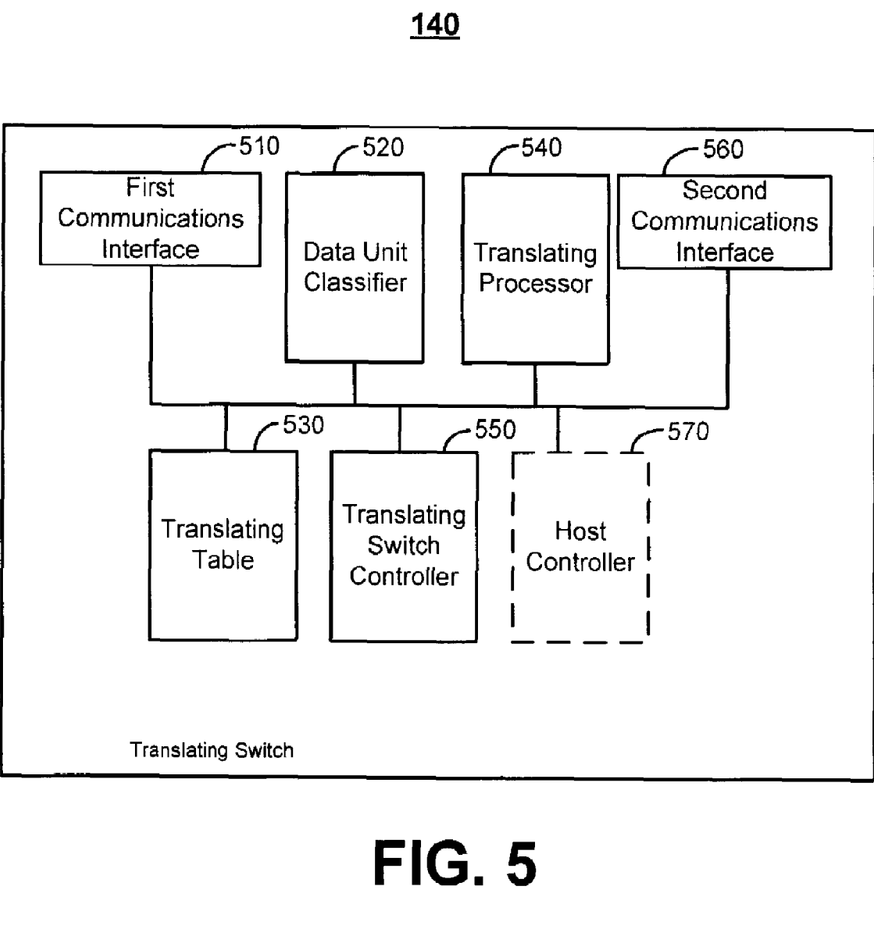
FIG. 5 is a block diagram of an exemplary translating switch that translates one or more data units into a translated data unit.

FIG. 5 illustrates components of exemplary translating switch 140 that is structured and arranged to receive a data unit, identify attribute information related to payload information, and translate the data unit into a translated data unit that includes an attribute portion corresponding to the attribute information identified from within the payload information. The translating switch 140 generally corresponds to the translating switch described previously. Generally, the translating switch 140 includes a first communications 510 to exchange data units from a terminal, a data unit classifier 520 to analyze payload information, a translating table 530 to identify an attribute portion related to payload information, a translating processor 540 to translate a data unit into a translated data unit with an attribute portion based on the payload information, a translating switch controller 550 to manage the translating switch, a second communications interface 560 to exchange translated data units with a host, and a host controller 570 to interface with a host.

The first communications interface 510 generally exchanges data units with the terminal 110. These data units may include a request for content and the responses that include the content. In one example, the first communications interface may include an Ethernet interface on a translating switch operated by a service provider. The Ethernet interface may receive one or more Ethernet frames with IP data, for example, IP version 4 or 6, for processing by the translating switch.

The data unit classifier 520 generally analyzes one or more parameters within the payload information. This payload information may be descriptive of the contents so as to enable intelligent mapping decisions to be made. For example, the data unit classifier may analyze the payload information and come across the string (e.g., '/user/local/bin/user1') that may identify the account that is being accessed. In another example, the payload information may include a message id that indicates which message is being requested in a folder of several messages.

The data unit classifier 520 may include multiple processing engines to classify the payload information. For example, the data unit classifier 520 may attempt to break down a data unit by traffic type. For example, web traffic (Transport Control Protocol (TCP) port 80) may be sent to a first processing engine, while mail traffic may be sent to a second processing engine.

The processing engine also may classify a data unit dynamically. For example, the logic in the processing engine may include a limited number of entries. A new type of traffic (e.g., from a new user) may be received that does not match one of the entries. The processing engine may swap-out the least-recently-used rules and replace them with a set of rules responsive to the new user.

The translating table 530 includes one or more functions that map the payload information to the attribute portion. Typically, this attribute portion is different than the attribute portion in the data unit received from the terminal. For example, a first user's electronic mailbox may be associated with a translated IP address 10.1.1.1, while a second user's electronic mailbox may be associated with a translated IP address 10.1.1.2. The translating table may include hierarchical and granular mappings to enable selecting accessing of data on the host. For example, the IP address for a first user may indicate the user's mailbox, the layer-4 information may indicate the folder within the mailbox, and the layer-5 information may indicate the specific message. There may be other parameters to indicate objects within the class. For example, in layer 5, port 0 may indicate the index of messages in a folder, while port 1 indicates that the first 10 messages should be retrieved. Beyond those ports, port 2 indicates message 0, port 3 indicates message 1, and so on.

Figure 5A:
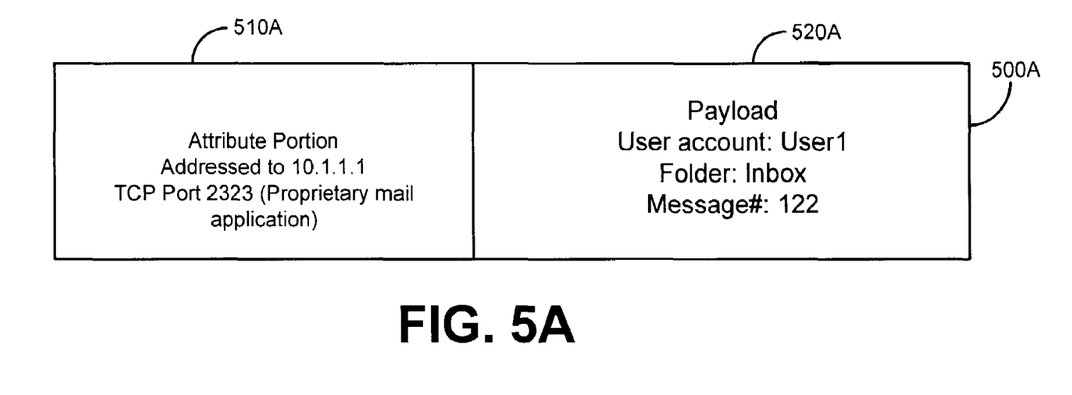
FIG. 5A is a diagram of an exemplary IP ("Internet Protocol") packet with an attribute portion and payload information supporting a user's access to mail.

Translating processor 540 modifies the data units received from the terminal to map the payload information identified by the data unit classifier 520 into the attribute portion according to the translating table 530. FIG. 5A illustrates one example of how an exemplary packet may be modified. For example, packet 500A shows an IP packet that might be received with an attribute portion 510A addressed to a mail server with an IP address of 10.1.1.1 and a TCP port number of 2323, indicating a proprietary mail application. The payload information 520A includes information indicating that user 1 is accessing the inbox folder to access message #122.

Figure 5B:
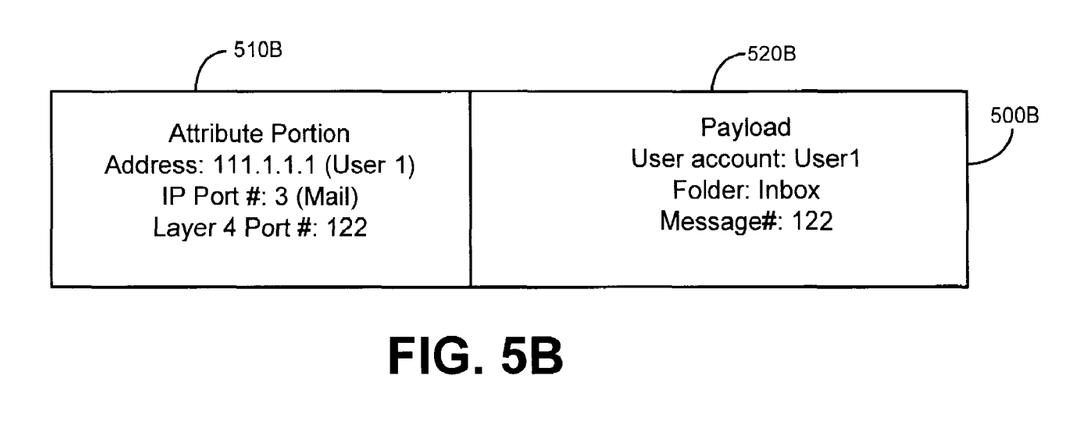
FIG. 5B is a diagram of an exemplary translated data unit with payload information mapped into the attribute portion.

As an example of the translation, the translating processor 540 may transform a packet such as the packet shown in FIG. 5A into a packet that is shown in FIG. 5B. In FIG. 5B, the attribute portion 510B of packet 500B has been modified based on information that appeared in the payload information 520B. Specifically, the IP address has been modified to an IP address associated with a user's services, in this case, IP address 111.1.1.1. This IP address associated with a user's services may be stored in the translating table 530. Similarly, the IP port number, in this case IP port 3, indicates that the user's mail application is being accessed. The layer-four port number is TCP port number 122, which indicates that message 122 is being accessed. The IP addresses and port numbers used here and throughout the application are for exemplary purposes. Other port numbers and IP addresses may be used.

Generally, the translating switch controller 550 manages the translating switch 140. The translating switch controller 550 may manage the exchange between the different subsystems in the translating switch 140. For example, the translating switch controller 550 may determine that more memory needs to be allocated to the translating table 530. System memory may be reallocated from the switching fabric to the translating table 530. In another example, the translating switch controller 550 may respond to SNMP ("Simple Network Management Protocol") requests.

The second communications interface 560 generally is structured and arranged to exchange data units with the host 150. Typically, these data units may include a translated request for content, and also the responses that include the content. In one example, the second communications interface 560 may include an Ethernet interface on a translating switch 140 operated by a service provider.

The translating switch 140 may include a host controller 580. Typically, the host controller 570 interfaces with a host 150 so that the host 150 may respond to the translated data units. For example, a server may include personalized content for 50,000 users. However, simultaneous access may only be required for 10,000 users. Thus, the sockets and mappings to support these 10,000 connections may be managed dynamically. For example, as a user logs onto a network, the related mappings for mail, web, media, IM and other services may be created and loaded to a translating switch. As a user logs off, the related mappings may be removed. As the mappings are established, similar mappings may be created on a host. As a mapping is removed, the related interfaces also may be removed. The interfaces, mappings, and sockets may be reused. For example, the same host IP address may be reused as different users log in and out.

To illustrate how the translating switch 140 may operate, exemplary operations of the systems in FIG. 5 are described. In this example, the first communications interface 510 may initially receive a packet requesting information from a host. The first communications interface 510 may transmit the packet to the data unit classifier 520, which identifies attribute information from within the payload information. The attribute information may be referenced in a translating table 530 to identify an attribute portion that will be used in the translated packet. The translating processor 540 then may use this attribute portion in the translated packet, with the second communications interface 560 transmitting the translated packet to the host. The host may be configured to respond to the packet by the host controller 570. Although not described in the sequence of operations, the translating switch controller 550 may manage the components and interfaces between these systems.

Although the translating switch 140 is described in the context of translating a data unit from a terminal, the translating switch 140 also may reverse translate a response to the translated data unit. For example, the second communications interface 560 may receive the response to the translated data unit. The data unit classifier 520 may classify the response with the translating table 530. The translating table 530 used in reverse translating may be the same table used in translating the data unit, or it may include a separate table and/or indexing. The translating processor 540 may interface with the data unit classifier 520 to determine how to process the response.

Figure 5C:
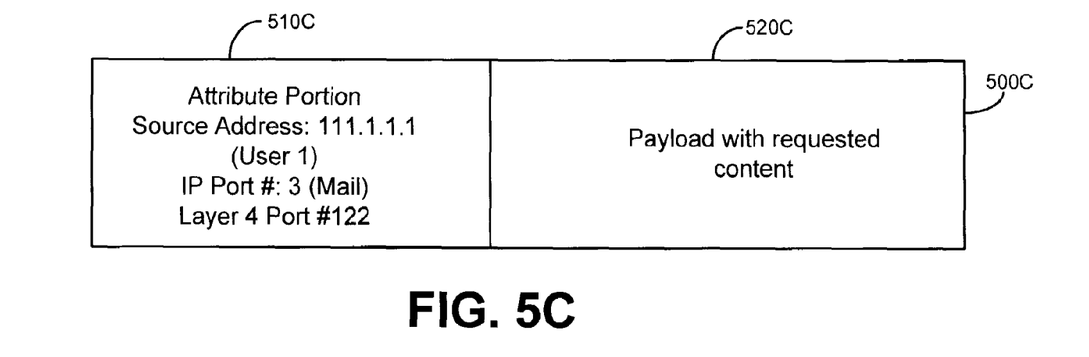
FIG. 5C is a diagram of an exemplary response to a translated data unit.

Illustrating how reverse translation may be performed, FIG. 5C is a diagram of a response to the translated data unit that may be received on the translating switch 140. The data unit 500C includes an attribute portion 510C and payload information 520D. Although not required, the attribute portion 510C is similar to the payload portion 520B of the translated data unit 500B. For example, the source address of the response is the destination address of the translated packet, in this case, IP address 111.1.1.1, which indicates that the services of user 1 were accessed and maps to IP address 10.1.1.1 using a translating table 530. Similarly, the source port address is IP port 3, which indicates that the response includes mail and the layer-four port indicates that message 122 is in the response, which information is mapped to TCP Port 2323 using translating table 530. The payload information 520C may include similar information to indicate the mail application data (e.g., user, folder, message). However, some applications may remove the mail application data from the payload information and put it in the attribute portion.

Figure 5D:
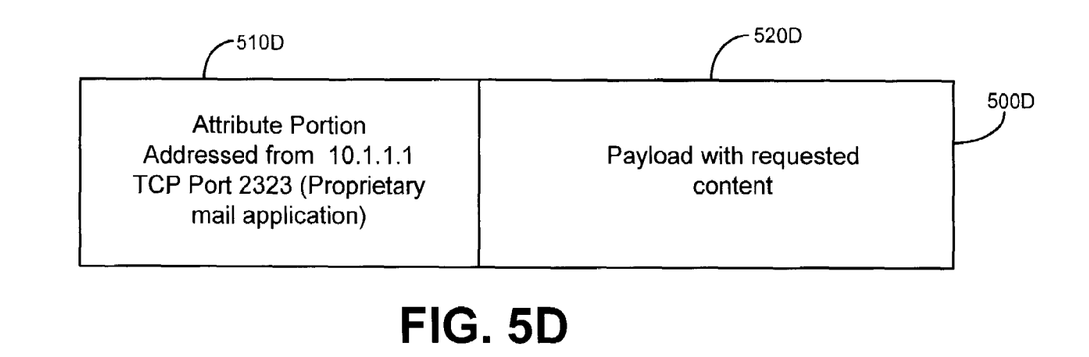
FIG. 5D is a diagram of an exemplary reverse-translated response.

An exemplary reverse translated response 500D is shown in FIG. 5D. The reverse translated response includes an attribute portion 510D similar to the attribute portion in the first data unit 500A. For example, the data unit 500A is addressed from 10.1.1.1, using the same TCP port (2323). Reverse translating the response so that it appears responsive to the first data unit 500A enables the terminal 110A to receive the response because the terminal 110 expects a response with related parameters in the attribute portion. The response 500D includes payload information 520D with the requested content.

Figure 6:
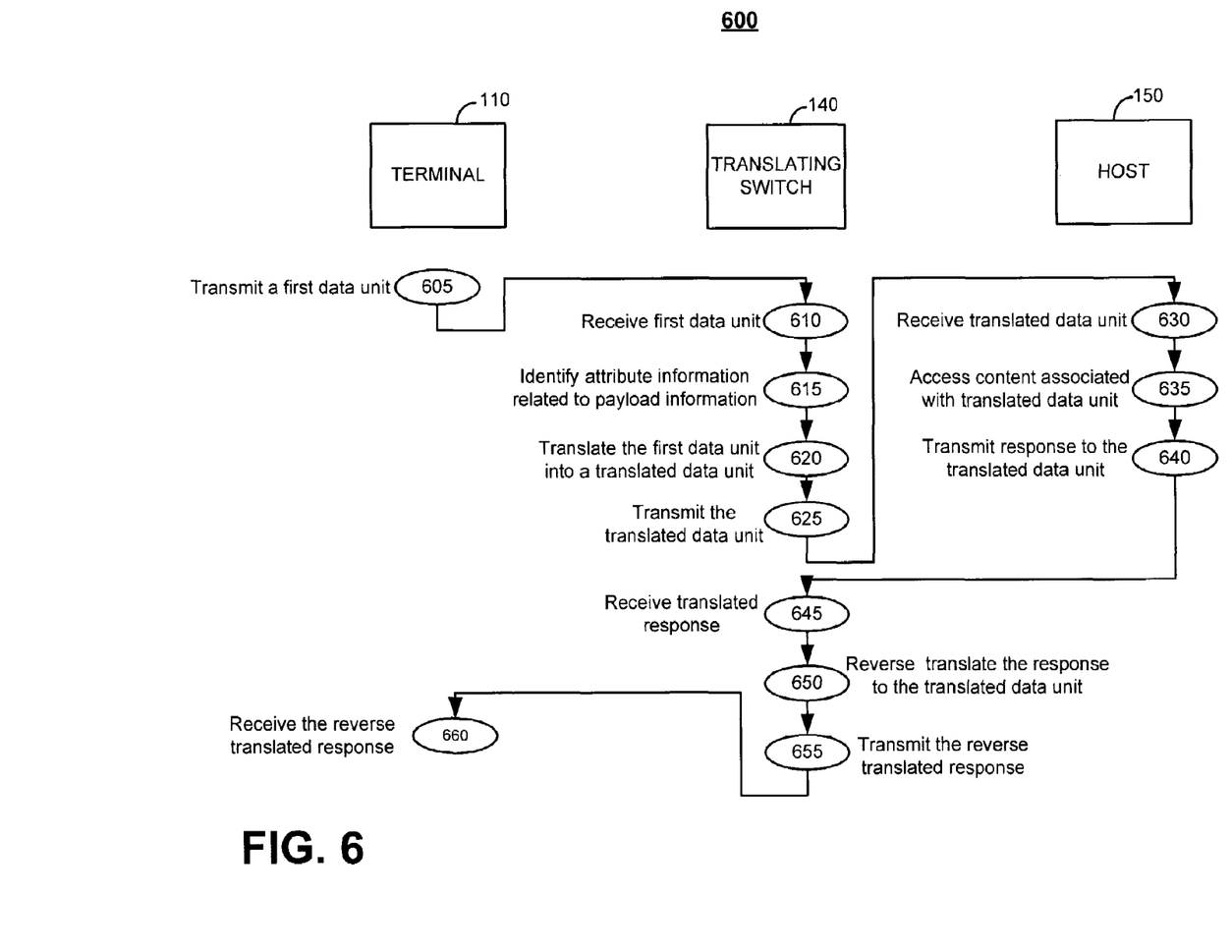
FIG. 6 is a flow chart showing how a terminal may interface with a translating switch to access one or more host resources.

Referring to FIG. 6, a terminal 110 may interface with a host 150 through a translating switch 140 according to a procedure 600. Initially, the terminal 110 transmits a first data unit to the translating switch 140 (step 605). For example, a user may request a personalized web page from a web host. In another example, the user may upload transaction data to execute a stock trade. The translating switch 140 receives the first data unit (step 610).

The translating switch 140 identifies attribute information related to the payload information (step 615). Determining attribute information from within the payload information may include looking at only a portion of the payload information. For example, the translating switch 140 may analyze the first few bytes in the payload portion and not analyze the remainder of the payload portion.

The translating switch 140 then translates the first data unit into a translated data unit (step 620). Translating the first data unit into a translated data unit may include modifying the payload information. For example, when payload information has been mapped into the attribute portion, the payload information that was referenced may be removed. In another example, the payload information may be preserved. The translating switch 140 transmits the translated data unit to the host 150 (step 625).

The host 150 then receives the translated data unit (step 630). Receiving the translated data unit may enable the host 150 to reduce the connection management and processing that is required. For example, a host may be configured to determine which piece of data is being accessed based on the attribute portion of the data unit with which it arrives. The attribute portion of a data unit may be configured in such a way that other levels of the protocol stack do not need to be decoded or analyzed to use information from that portion of the protocol stack. To illustrate, the attribute portion may be configured so that the host may take responsive action without analyzing other levels of the protocol stack and/or the payload portion of the data unit. In one example, the host may be configured to analyze certain fields in the attribute portion to determine which file to access. In another example, the host may be configured to determine which user action in a program has been selected by looking at the attribute portion of the data unit. This may include determining which mail message a user has selected to retrieve.

The host 150 accesses content associated with the translated data unit (step 635). The host 150 transmits a response to the translated data unit (step 640).

The translating switch 140 then receives the translated response (step 645). The translating switch 140 reverse translates the response to the translated data unit (step 650). The translating switch 140 transmits the reverse-translated response (step 655) to the terminal 110, which then receives the response (step 660).

Figure 7:
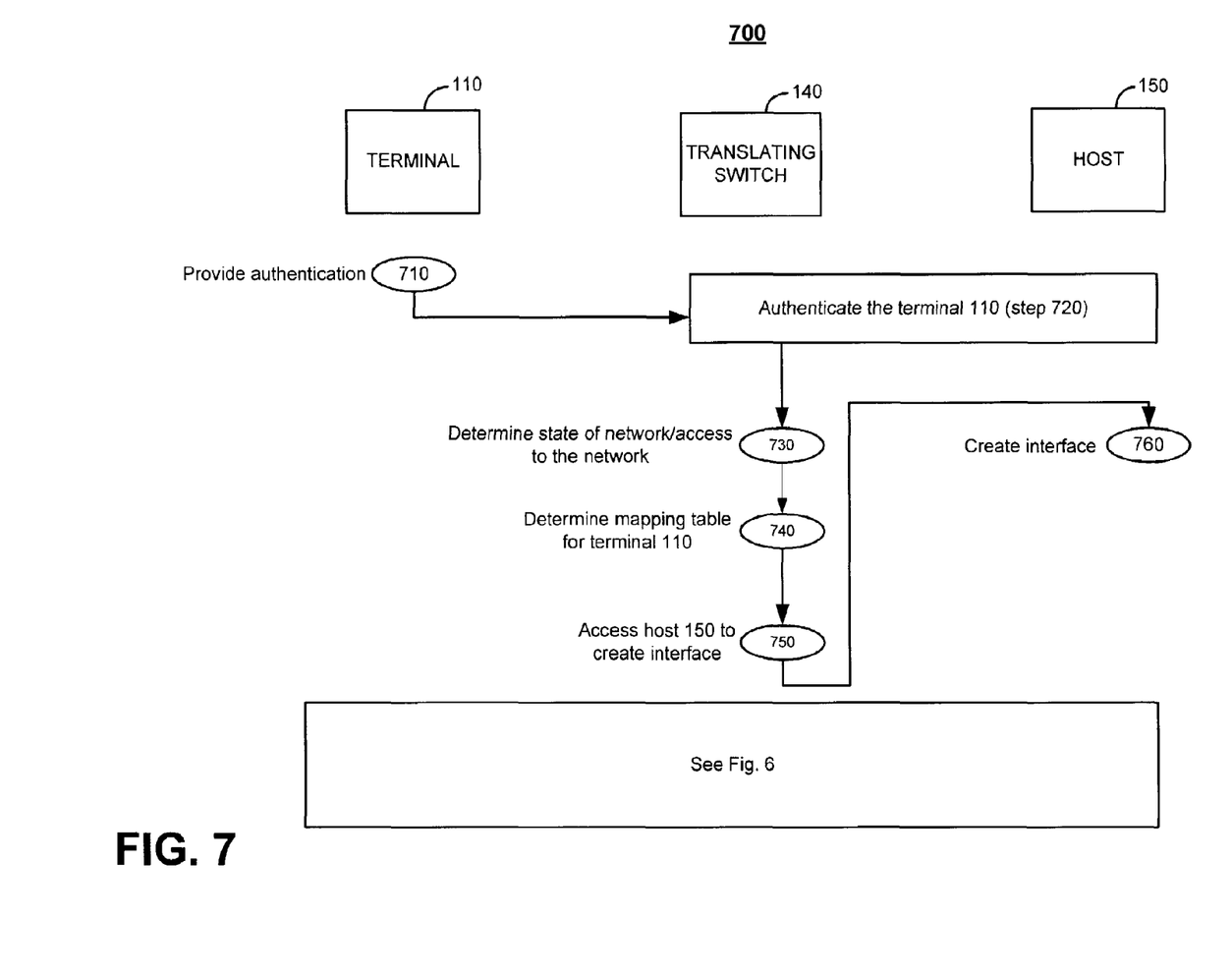
FIG. 7 is a flow chart showing how a terminal may interface with the translating switch and a host to create an interface on the host that can respond to translated packets.

Referring to FIG. 7, a translating switch 140 may interface with a host 150 to create an interface on the host 150 according to a procedure 700. In general, aspects of the systems shown in FIG. 7 relate to the systems describe previously. However, FIG. 7 illustrates how a translating switch 140 may dynamically determine a mapping table responsive to the terminal 110, and also how the host may create an interface responsive to that mapping table.

Initially, the terminal 110 provides authentication (step 710). The translating switch 140 and/or the host 150 then authenticate the terminal (step 720). As is shown in FIG. 7, by authentication being performed by the translating switch 140 and the host 150, the authentication sequence may be performed in a variety of ways. In one example, an authentication code segment runs on the translating switch 140. Upon receiving an authentication request, the authentication code segment may access on-device or off-device parameters (e.g., login name and password) to authenticate the terminal 110. In another example, authentication of the IP address may be performed on the translating switch 140 while password authentication is performed on the host 150. In yet another example, authentication may be entirely on the host 150.

Although authentication is shown as occurring first, authentication need not be required. For example, a service provider may determine that access to publicly-accessible resources (e.g., an Internet news site) does not require authentication. Access to these sites from public users may be routed through a translating policy that does not require authentication. Instead, a default mapping table may be used.

The translating switch 140 determines the state of the network (step 730). Determining the state of the network may include determining the state of demand for host resources. For example, determining the state of the network may include determining that the load for a host device (e.g., a web server) is minimal, and addressing resources (e.g., IP addresses) at lower levels of the protocol stack are not in contention. Accordingly, the mapping table may use an addressing scheme in the attribute portion with more selection criteria in lower levels of the protocol stack. In contrast, during periods of contention for resources and/or addressing space, the attribute portion may be modified at higher levels of the protocol stack to create a larger pool of addressing information. For example, an online service provider may initially operate a translating switch to modify IP addresses (layer three) and transport layer information (layer four). However, during periods of contention or as the user population grows, the online service provider may use layers three through six to translate a data unit.

In another example, determining the state of the network may include determining the state of processing resources on a network. For example, a service provider may separate processing resources from storage. In this example, determining the state of the network may include determining that a present processing resource is operating at or near available capacity and a new processing resource should be used to support the newly-authenticated terminal.

In any event, the translating switch 140 determines a mapping table for the terminal 110 (step 740). Generally, determining a mapping table includes identifying one or more services required by the terminal, identifying payload information related to the services for the terminal, and determining one or more attribute portions that relate to the payload information. For example, a translating switch 140 may authenticate a first user. The authenticated user may have a list of services associated with his account (e.g., mail, Instant Messaging, and Internet Radio). The translating switch 140 may identify a list of keywords in the payload information on which to filter to create the mapping table. The translating switch 140 then may create an attribute portion associated with these keywords in the mapping table. For example, the translating switch 140 may filter mail traffic on the keywords 'inbox', 'outbox', and 'message-ID' if those parameters typically appear in the payload information of a data unit of mail data. The translating switch then may map each of these keywords to the attribute portion. For example, if the string 'inbox' is found in the payload information of a data unit, the translated data unit may map a certain address (e.g., a first TCP port number) to a field in the attribute portion, while if the string 'outbox' is found in the payload information, the translated data unit may map that payload information to a different address (e.g., a second TCP port number). In another example, the translating switch 140 may create conditional filters in the mapping table. For example, if the string 'inbox' is found in the payload information of a data unit, then the translating switch may scan the payload information for the string 'Message-ID' and the subsequent digits indicating which message is being retrieved. This Message-ID parameter may be associated with a function that maps a message ID to the attribute portion, independent of the relative message numbering of the mail application. For example, an inbox may be associated with a list of five message IDs that are not sequentially numbered. The mapping table may include logic to map the messages to a base number used in the attribute portion (e.g., TCP Port 1000), and index the messages sequentially from the base number (e.g., the messages are numbered 1000-1004), even though the underlying content accessed may not be sequentially numbered.

With the mapping table, and/or the state of the network determined, the translating switch 140 interfaces with the host 150 to create an interface (step 750). The host 150 creates the interface (step 760). Although flow chart 700 shows the translating switch determining the mapping table and the state of the network being performed prior to creating an interface, creating the interface may be performed independently and/or before the other determinations. For example, a service provider may create an addressing scheme for the attribute portion in advance that maps well to all terminals, regardless of the size of the user base. In this example, the interface may be created once the terminal 110 is authenticated.

The interface may be created and loaded in advance (e.g., not be loaded dynamically). For example, a host 150 may have an interface set up in advance responsive to a set of users. The interface remains present on one or more host devices, with access to the interface being controlled by the translating switch. With an interface created, the terminal 110 may interface through the translating switch 140 to access host 150, for example, by the operations described in FIG. 6.

Thus, the attribute portion of the translated data unit can be used by networking equipment to identify lower-level host resources, eliminating or reducing the need for host services to handle recovered data units through inspection of their payload portion.

Other implementations are within the scope of the following claims. For example, a management device may perform one or more of the functions described with respect to the translating switch. The management device may include a program running on a separate device that is part of the host (e.g., a server), and/or include a component (e.g., a processing blade) in the translating switch.

Additionally, although certain operations were described with respect to certain systems, other devices may perform these operations. For example, although determining a mapping table is described as being performed on a translating switch, those operations also may be performed on the host 150. Similarly, proxy devices and intermediary devices may be used to perform one or more operations. For example, a load-balancing switch may be used as an intermediary device between the translating switch 140 and the host 150.

The translating switch may be particularly useful in the context of data center operations. For example, the translating switch may include large amounts of memory. This memory may be used to store user state information. For example, as packets are sent to a server in the data center, the translating switch may add information descriptive of the user state, and encode the user state parameters in the data unit. The user state information may include data related to the user application. However, the user state may include information considered to be unrelated to the user application. For example, a user profile, demographic, or preference may be transmitted in the attribute portion of the data unit.

In one instance, the translating switch may receive a request for a web page from the user. The translating switch may access the user state residing in memory/storage on or accessible to the switch. For example, the user state may indicate the user's favorite color, favorite sport, and favorite athletic team. The translating switch transmits the data unit, which may incorporate these user descriptive parameters into the attribute portion. For example, an IP packet being sent to a sports web page (e.g., cnnsi.com) may be sent with the portions of the protocol stack indicating these preferences. The host may receive the packet with these parameters, and learn the user preferences from the packet itself. This may eliminate additional host processing that is required to acquire these parameters, for example, by retrieving user information on another device or on another part of the host.

There may be several variations on how the memory describing the user state may be managed. In one example, the user state information may be managed dynamically. For example, a translating switch may selectively load portions of a user's state information likely to be accessed. For example, if a messaging application were accessed, the user's delivery options may be loaded to the translating switch while the user preferences for banking services may not be loaded to the translating switch until the user accesses a banking application. Similarly, during a period of heightened user demand, the portion of the user state information loaded to a translating switch may be reduced to accommodate the increased demand. For example, if it is projected that using larger user state lists will surpass available memory by 100%, the translating switch may adjust the user state lists by reducing state list by 50% or more. In one instance, a shortened user state list may be loaded for one or more users instead of loading a full user state for each user. In another example, the translating switch may support premium users with a full user state, load the shortened user state for a second class of users, and not load a user state for a third class of users. For the third set of users without the user state, their data units may not be translated and reverse translated in accordance with a user state list, or may not even be translated at all.

For example, in the three-tiered model of user states described above (e.g., full user state, shortened user state, no user state), premium users with the full user state may access web pages configured to be more responsive based on a more detailed profile. Similarly, the users who have a shortened user state loaded to memory may access content that is responsive to their profile, but not based on the same granularity of a profile associated with premium users.

The user may or may not be cognizant of their premium designation. For example, a retail vendor may identify valued customers. The vendor may enable these valued customers to have a premium designation.

The translating switch may be complementary to data center operations in other ways. For example, the translating switch may map the applications to a simplified configuration. A device receiving the simplified data unit may determine that only certain portions of the data unit may be required to launch a responsive application, process, or socket based on those certain portions. The simplified configuration may even include mapping the data unit to another instance of the TCP/IP stack. For example, a host may be configured to respond to an application based on the destination IP address and the layer four port. Even though additional protocol information may be present in a data unit, the additional parameters may not be used in the processing of the data unit.

The concept of a data center may include configurations beyond a large facility of computers. The data center may include the periphery of a service provider network. For example, as services and applications are hosted closer to consumers, the data center may include the periphery of the network. The data center may even be distributed at cable head ends and access points (e.g., a wireless base station or switching site), where networking equipment and translating switches may be located in an environment of other organizations' systems.

The translating switch also may be used to manage processors dynamically. For example, a service provider may manage a pool of processors. These processors may be configured to operate in response to changing network and service provider conditions. For example, in a pool of 100 processors, the pool may normally be configured so that 50 processors perform electronic mail service and 50 processors perform instant messaging services. However, in response to increased demand for instant messaging services, the processors may be reallocated so that more processors respond to the increased demand for instant messaging services. For example, 60 processors might be allocated to instant messaging and 40 processors might be allocated to electronic mail in response to the increased demand.

In one example, the translating switch may manage the processors by tracking the state of traffic through the translating switch. For example, the translating switch may track processor demand by monitoring link utilization, connection count, and connection state for one or more devices. The translating switch may determine that although a particular processor is supporting a large number of connections, many of the connections are not actively exchanging data, enabling a larger number of connections to be supported on a processor. The processor may be monitored by maintaining aggregate state information as data units are translated. For example, as a translation policy is used or activated, the translating switch may update a table tracking processor usage.

In response to processor utilization, the translating switch may reconfigure one or more processors. In one example, when the translating switch determines that a processor needs to be reallocated, the translating switch may use a translating switch application configured to establish a management session on the processor. The management session then may terminate one program and launch another program. For example, an electronic mail program may be terminated and an instant message program may be launched.

In another example, the translating switch may incorporate parameters in the attribute portion of a data unit to manage the processor dynamically. For example, the translating switch may use a first offset in a layer four field to identify an application. A second offset may be used to indicate whether the application should be initiated or terminated. For example, a first data unit may be received with layer four parameters instructing a processor to terminate an electronic mail application. Similarly, the translating switch may transmit a second data unit with termination instructions encoded in a layer four field to terminate a session of an electronic mail application (e.g., for a particular user).

The translating switch may manage the processors with a high degree of granularity. For example, the processor need not dedicate a processor to a specific function. Rather, the translating switch may allocate a fraction of the processor resources on a processor to different tasks. For example, the translating switch could allocate a percentage of processing power, memory, and/or storage for a particular task.

The translating switch may selectively manage individual user sessions on a processor. For example, the translating switch may initiate and terminate user sessions on a processor. In another example, the user session may be transferred to another processor as the pool of processors is reconfigured.

Some of the examples of the translating switch have been described in the context of associating an IP address related with a specific user. However, in some cases, having large number of users (e.g., a service provider or large enterprise) may pose challenges with assigning a host a user-specific IP address. Accordingly, depending on addressing constraints and the size of the user community, higher levels of the protocol stack may be used to distinguish between different users and their applications.

Also, every received data unit does not necessarily create a translated data unit. Rather, the received data unit may generate multiple translated data units and multiple received data units may generate one translated data unit. For example, a received IP packet may generate multiple translated IP packets.

What is claimed is:

1. A translating switch comprising:
a first communications interface configured to receive a data unit, the data unit including an attribute portion and a payload portion;
a data unit classifier configured to:
inspect the payload portion of the data unit, and
identify, from within the payload portion of the data unit, a request for content based on the inspection of the payload portion of the data unit;
a first processor configured to map the identified request for content included in the payload portion of the data unit to an address at which the requested content is made available, the address having a different format than the identified request for content included in the payload portion of the data unit;
a second processor configured to modify the attribute portion of the data unit to include the address at which the requested content is made available based on the mapping; and
a second communications interface configured to transmit the modified data unit.

2. The translating switch of claim 1 wherein the second processor is configured to modify the attribute portion of the data unit by configuring the attribute portion such that a host receiving the modified data unit may determine which content to provide based on the attribute portion of the modified data unit.

3. The translating switch of claim 1 wherein the second processor is configured to modify the attribute portion of the data unit based on the revised by configuring the attribute portion such that a host receiving the modified data unit may process the data unit without analyzing other levels in a protocol stack.

4. The translating switch of claim 1 wherein the second processor is configured to modify the attribute portion of the data unit by configuring the attribute portion such that a host receiving the modified data unit may process the data unit without analyzing the payload portion.

5. The translating switch of claim 1 wherein the requested content includes an electronic mail message, an instant message, a web page, or a media stream.

6. The translating switch of claim 1 wherein the second processor is configured to modify the attribute portion of the data unit by transforming the attribute portion of the data unit while preserving the payload portion of the data unit such that the payload portion of the modified data unit matches the payload portion of the received data unit.

7. The translating switch of claim 1 wherein the second processor is configured to modify the attribute portion of the data unit by generating a modified data unit that includes a modified attribute portion and the payload portion of the data unit.

8. A method of transmitting a data unit, the method comprising:
receiving a data unit, the data unit including an attribute portion and a payload portion;
inspecting the payload portion of the data unit;
identifying, from within the payload portion of the data unit, a request for content based on the inspection of the payload portion of the data unit;
mapping the identified request for content included in the payload portion of the data unit to an address at which the requested content is made available, the address having a different format than the identified request for content included in the payload portion of the data unit;
modifying the attribute portion of the data unit to include the address at which the requested content is made available based on the mapping; and
transmitting the modified data unit.

9. The method of claim 8 wherein modifying the attribute portion of the data unit includes configuring the attribute portion such that a host receiving the modified data unit may determine which content to provide based on the attribute portion of the modified data unit.

10. The method of claim 8 wherein modifying the attribute portion of the data unit includes configuring the attribute portion such that a host receiving the modified data unit may process the data unit without analyzing other levels in a protocol stack.

11. The method of claim 8 wherein modifying the attribute portion of the data unit includes configuring the attribute portion such that a host receiving the modified data unit may process the data unit without analyzing the payload portion.

12. The method of claim 8 wherein the requested content includes an electronic mail message, an instant message, a web page, or a media stream.

13. The method of claim 8 wherein modifying the attribute portion of the data unit includes transforming the attribute portion of the data unit while preserving the payload portion of the data unit such that the payload portion of the modified data unit matches the payload portion of the received data unit.

14. The method of claim 8 wherein modifying the attribute portion of the data unit includes generating a modified data unit that includes a modified attribute portion and the payload portion of the data unit.

15. The method of claim 8 wherein:
identifying, from within the payload portion of the data unit, the request for content based on the inspection of the payload portion of the data unit comprises identifying, from within the payload portion of the data unit, a string that identifies an account of a user being accessed;
mapping the identified request for content included in the payload portion of the data unit to an address at which the requested content is made available comprises mapping the identified string that identifies the account of the user included in the payload portion of the data unit to an Internet Protocol address associated with the account of the user, the identified string that identifies the account of the user included in the payload portion of the data unit being different than an Internet Protocol address; and
modifying the attribute portion of the data unit to include the address at which the requested content is made available based on the mapping comprises modifying the attribute portion of the data unit to include the Internet Protocol address associated with the account of the user.

16. The method of claim 8 wherein:
identifying, from within the payload portion of the data unit, the request for content based on the inspection of the payload portion of the data unit comprises identifying, from within the payload portion of the data unit, a message identifier that indicates which message is being requested in a folder of several messages included in a user's electronic mailbox;
mapping the identified request for content included in the payload portion of the data unit to an address at which the requested content is made available comprises mapping the identified message identifier to an Internet Protocol address associated with the user's electronic mailbox; and
modifying the attribute portion of the data unit to include the address at which the requested content is made available based on the mapping comprises modifying the attribute portion of the data unit to include the Internet Protocol address associated with the user's electronic mailbox.

17. The method of claim 16 wherein:
mapping the identified request for content included in the payload portion of the data unit to an address at which the requested content is made available further comprises mapping the identified message identifier to layer-4 information indicating the folder of several messages included in the user's electronic mailbox and layer-5 information indicating the requested message; and
modifying the attribute portion of the data unit further comprises modifying the attribute portion of the data unit to include the layer-4 information indicating the folder of several messages included in the user's electronic mailbox and the layer-5 information indicating the requested message.

18. The method of claim 8 wherein mapping the identified request for content included in the payload portion of the data unit to an address at which the requested content is made available comprises:
accessing, from electronic storage, a translating table that includes hierarchical and granular mappings that enable accessing of data made available by a remote host; and
mapping the identified request for content included in the payload portion of the data unit to an address at which the requested content is made available according to the hierarchical and granular mappings included in the accessed translating table.

19. The method of claim 8 further comprising:
creating and loading to a translating switch mappings for multiple content services associated with a user when the user logs onto a network; and
removing from the translating switch the mappings for the multiple content services associated with the user when the user logs off of the network,
wherein identifying, from within the payload portion of the data unit, the request for content based on the inspection of the payload portion of the data unit comprises identifying, from among the multiple content services associated with the user, a content service from which the user is requesting content, and
wherein mapping the identified request for content included in the payload portion of the data unit to an address at which the requested content is made available comprises mapping the identified content service from which the user is requesting content to an address associated with the identified content service according to the mappings loaded to the translating switch.

20. A translating switch comprising:
means for receiving a data unit, the data unit including an attribute portion and a payload portion;
means for inspecting the payload portion of the data unit;
means for identifying, from within the payload portion of the data unit, a request for content based on the inspection of the payload portion of the data unit;
means for mapping the identified request for content included in the payload portion of the data unit to an address at which the requested content is made available, the address having a different format than the identified request for content included in the payload portion of the data unit;
means for modifying the attribute portion of the data unit to include the address at which the requested content is made available based on the mapping; and
means for transmitting the modified data unit.

* * * * *